US008577168B2

(12) United States Patent
Hong et al.

(10) Patent No.: US 8,577,168 B2
(45) Date of Patent: Nov. 5, 2013

(54) SYSTEM AND METHOD FOR IN-LOOP DEBLOCKING IN SCALABLE VIDEO CODING

(75) Inventors: Danny Hong, New York, NY (US); Alexandros Eleftheriadis, Tenafly, NJ (US); Ofer Shapiro, Fair Lawn, NJ (US)

(73) Assignee: Vidyo, Inc., Dallas, TX (US)

( * ) Notice: Subject to any disclaimer, the term of this patent is extended or adjusted under 35 U.S.C. 154(b) by 1067 days.

(21) Appl. No.: 11/966,474

(22) Filed: Dec. 28, 2007

(65) Prior Publication Data

US 2008/0159404 A1 Jul. 3, 2008

Related U.S. Application Data

(60) Provisional application No. 60/882,281, filed on Dec. 28, 2006, provisional application No. 60/911,767, filed on Apr. 13, 2007.

(51) Int. Cl.
*G06K 9/40* (2006.01)

(52) U.S. Cl.
USPC ..................................... 382/268; 375/240.29

(58) Field of Classification Search
None
See application file for complete search history.

(56) References Cited

U.S. PATENT DOCUMENTS

| | | | |
|---|---|---|---|
| 2006/0083309 A1 | 4/2006 | Schwarz et al. | |
| 2006/0126962 A1* | 6/2006 | Sun | 382/268 |
| 2006/0274959 A1 | 12/2006 | Piastowski | |
| 2006/0280372 A1 | 12/2006 | Han | |
| 2006/0285757 A1 | 12/2006 | Abe et al. | |
| 2006/0285766 A1 | 12/2006 | Ali | |
| 2007/0009050 A1* | 1/2007 | Wang et al. | 375/240.29 |

* cited by examiner

*Primary Examiner* — Andrew Lai
*Assistant Examiner* — Leon Andrews
(74) *Attorney, Agent, or Firm* — Baker Botts LLP (57) ABSTRACT

A system and a method for deblocking a reconstructed/decoded picture in a scalable video encoding/decoding system is provided. Deblocking is accomplished by applying a filter to smooth pixel values adjacent to a boundary shared by two blocks. The type of the filter applied depends on quantization parameter (QP) values assigned to the two blocks. An enhancement layer (EL) block is assigned a QP value based on its coded information and the QP value of its corresponding base layer (BL) block(s).

15 Claims, 7 Drawing Sheets

SVC ENHANCEMENT LAYER ENCODER; EL REFERS TO ENHANCEMENT LAYER AND BL REFERS TO BASE LAYER; THE PRESENT INVENTION RELATES TO THE DEBLOCKING FILTER PROCESS HIGHLIGHTED IN RED

FIG. 1: SVC ENHANCEMENT LAYER ENCODER; EL REFERS TO ENHANCEMENT LAYER AND BL REFERS TO BASE LAYER; THE PRESENT INVENTION RELATES TO THE DEBLOCKING FILTER PROCESS HIGHLIGHTED IN RED

FIG. 1

FIG. 2: SVC ENHANCEMENT LAYER DECODER; THE PRESENT INVENTION RELATES TO THE DEBLOCKING FILTER PROCESS HIGHLIGHTED IN RED

FIG. 2

FIG. 3: BLOCK BOUNDARIES THAT ARE BEING DEBLOCKED; $Block_A$ IS THE LEFT BLOCK OF THE CURRENT BLOCK ($Block_C$) AND $Block_B$ IS THE TOP BLOCK OF THE CURRENT BLOCK

FIG. 3

FIG. 4: BOUNDARY PIXELS; DEPENDING ON THE BOUNDARY (LEFT OR TOP) P0, P1 AND P2 ARE PIXELS OF Block$_A$ OR Block$_B$ (SEE FIG. 3), WITH P0 RIGHT ON THE BOUNDARY; Q0, Q1 AND Q2 ARE PIXELS OF CURRENT BLOCK (Block$_C$), WITH Q0 RIGHT ON THE BOUNDARY

FIG. 4

FIG. 5: A HIGH-LEVEL FLOW CHART OF SVC DEBLOCKING PROCESS FOR EACH BOUNDARY; $Block_X$ IS EITHER $Block_A$ OR $Block_B$ (SEE FIG. 3)

FIG. 5

FIG. 6: SVC ENHANCEMENT LAYER ENCODER WITH THE MODIFIED DEBLOCKING FILTER PROCESS; THE ENHANCED PROCESS DEPENDS ON THE BL QP

FIG. 6

FIG. 7: SVC ENHANCEMENT LAYER DECODER WITH THE MODIFIED DEBLOCKING FILTER;
THE ENHANCED PROCESS DEPENDS ON THE BL QP

FIG. 7

SYSTEM AND METHOD FOR IN-LOOP DEBLOCKING IN SCALABLE VIDEO CODING

CROSS-REFERENCE TO RELATED APPLICATIONS

This application claims the benefit of U.S. provisional patent application Ser. No. 60/882,281, filed Dec. 28, 2006, and Ser. No. 60/911,767, filed Apr. 13, 2007. Further, this application is related to International patent application No. PCT/US06/028365, filed Jul. 20, 2006, which claims priority from U.S. Provisional Patent Application No. 60/701,108 filed Jul. 20, 2005. All of the aforementioned applications, which are commonly assigned, are hereby incorporated by reference herein in their entireties.

FIELD OF THE INVENTION

The present invention relates to the in-loop deblocking processes specified in scalable video coding standards. In particular, the invention relates to mechanisms for selecting deblocking related threshold values for each block of a reconstructed/decoded picture.

BACKGROUND OF THE INVENTION

In the H.264 video coding standard, it is possible to deblock a reconstructed/decoded picture (simply referred to as a decoded picture) for better display and also for better inter-picture prediction. In order to remove blocking artifacts in low bit-rate block-based video coding, a method (commonly called "in-loop deblocking filter") is applied to smooth pixels, which are adjoining a block boundary. (See ITU-T and ISO/IEC JTC 1, "Advanced video coding for generic audio-visual services," ITU-T Recommendation H.264 and ISO/IEC 14496-10 (MPEG4-AVC); ITU T Rec. H.264|ISO/IEC 14496-10 version 1 refers to the first approved version (2003) of this Recommendation|International Standard; ITU T Rec. H.264|ISO/IEC 14496-10 version 2 refers to the integrated text containing the corrections specified in the first technical corrigendum; ITU T Rec. H.264|ISO/IEC 14496-10 version 3 refers to the integrated text containing both the first technical corrigendum (2004) and the first amendment, which is referred to as the "Fidelity range extensions"; and ITU T Rec. H.264|ISO/IEC 14496-10 version 4 (the current specification) refers to the integrated text containing the first technical corrigendum (2004), the first amendment (the "Fidelity range extensions"), and an additional technical corrigendum (2005). In the ITU-T, the next published version after version 2 was version 4 (due to the completion of the drafting work for version 4 prior to the formal approval opportunity for a final of the version 3 text)).

The current draft of the new Annex G of the H.264 standard (referred to as the SVC standard) specifies a scalable coding extension, where additional layers are described for enhancing (spatially, temporally, and quality-wise) a basic H.264 coded bitstream. The decoded pictures of spatial and quality enhancement layers (hereinafter called enhancement layers) can also be deblocked using an in-loop process that is a simple modification of the basic H.264 deblocking process; this process is described in the SVC standard. (See T. Wiegand, G. Sullivan, J. Reichel, H. Schwarz, M. Wien, eds., "Joint Draft ITU-T Rec. H.264|ISO/IEC 14496-10/Amd.3 Scalable video coding," Joint Video Team, Doc. JVT-X201, which is publicly available at the website ftp3.itu.int/av-arch/jvt-site/2007_06_Geneva/JVT-X201.zip, July 2007, and which is incorporated by reference herein in its entirety).

In the SVC standard deblocking process, each individual block (e.g., 4×4 or 8×8) of a picture is deblocked differently depending on how the individual block is coded. One of the coding parameters that affects deblocking is the quantization parameter (QP) used for the block. A lower QP indicates finer quantization of the coefficients representing the block pixels, and thus yields a better decoded representation of the original block. In the deblocking process, the QP of each block is used to derive the threshold values for deciding whether to deblock or not, and for determining how many boundary pixels to smooth out and by how much.

In the case where an enhancement layer block has no encoded information of its own and all information needed to decode the enhancement layer block is derived from its base layer block, which often happens when the enhancement layer block is encoded in higher QP than the base layer block, using the enhancement layer block's QP tends to smooth out more pixels than needed to address the boundary artifacts.

Consideration is now being given to improving processes for deblocking scalable-encoded video picture blocks, and in particular, enhancement layer blocks.

SUMMARY OF THE INVENTION

System and method for improving or enhancing deblocking processes in scalable video coding is provided. The system and method are based on a new derivation of a QP value for each block, which is used for selecting threshold values for initiating deblocking.

In instances where an enhancement layer block is encoded in a higher QP than the base layer block, standard deblocking processes using the enhancement layer block's QP often over-compensate and tend to smooth out more pixels than is needed to address boundary artifacts. In such instances, it may be preferable both subjectively and quantitatively, to use a QP value that is an average of the QP of the base and the enhancement layer blocks.

The mechanism of the present invention uses each enhancement layer (EL) block's coded information and the corresponding base layer (BL) block's QP value in deriving the EL block's QP for effective deblocking. This simple modification to the QP derivation algorithm can yield more than 0.3 dB gain in the cases where the EL QP is much larger than the BL QP. Any application in which BL is encoded at a fixed quality or rate, but EL is strictly rate controlled, can often experience instances or conditions when the EL QP is much larger than the base layer QP.

In other cases (e.g., when the EL QP is not much larger than or the same as the BL QP), the mechanism appears to have no deleterious effect. Almost no subjective and quantitative differences are seen between standard deblocking methods and test applications of the mechanism.

Throughout the figures the same reference numerals and characters, unless otherwise stated, are used to denote like features, elements, components or portions of the illustrated embodiments. Moreover, while the present invention will now be described in detail with reference to the figures, it is being done so in connection with the illustrative embodiments.

DETAILED DESCRIPTION OF THE INVENTION

Recent video coding standards make use of advanced video coding techniques to provide better compression performance than previous video coding standards such as MPEG-2, MPEG-4, and H.263. Yet all of these standards involve the hybrid video coding technique of block motion compensation plus transform coding. Block motion compensation is used to remove temporal redundancy between successive images (frames), whereas transform coding is used to remove spatial redundancy within each frame.

Figure 1:
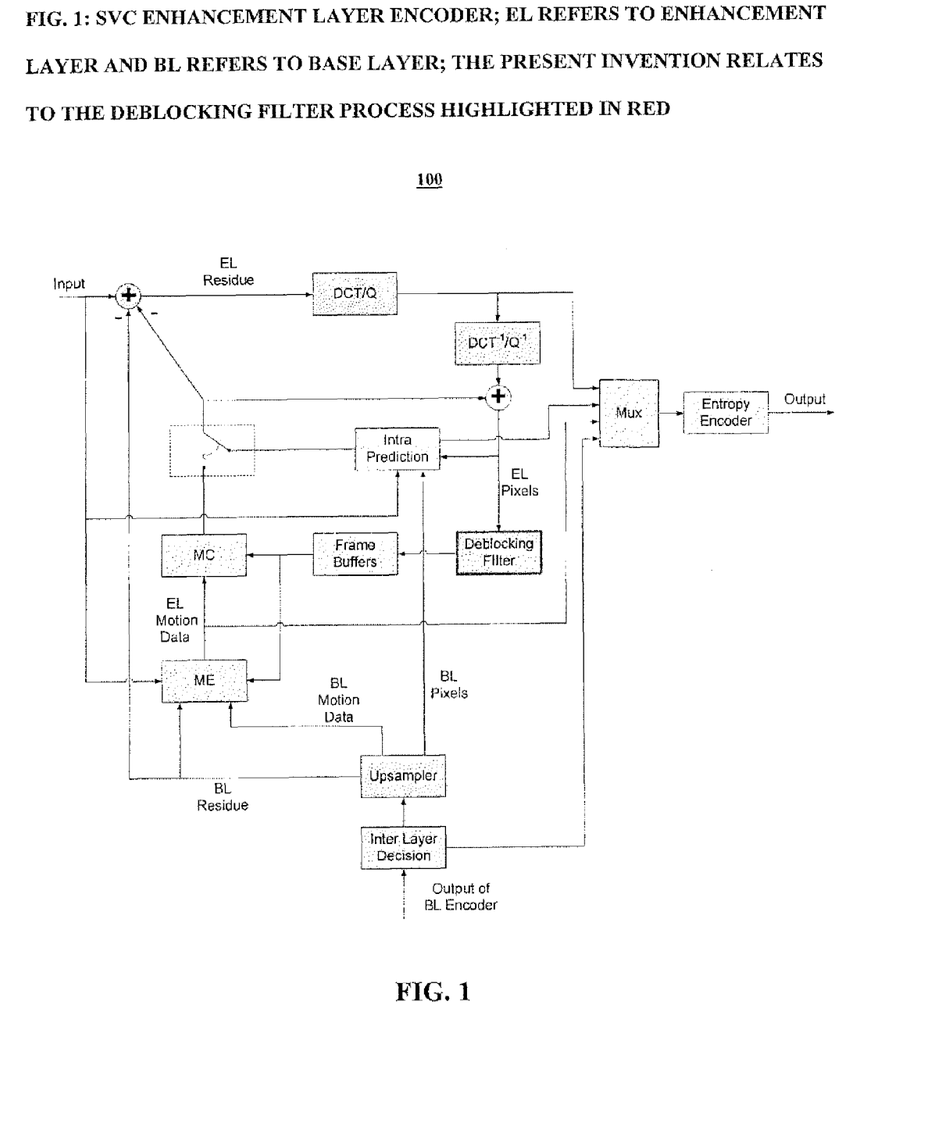
FIG. 1 is a block diagram illustrating an exemplary prior art SVC enhancement layer encoder.
Figure 2:
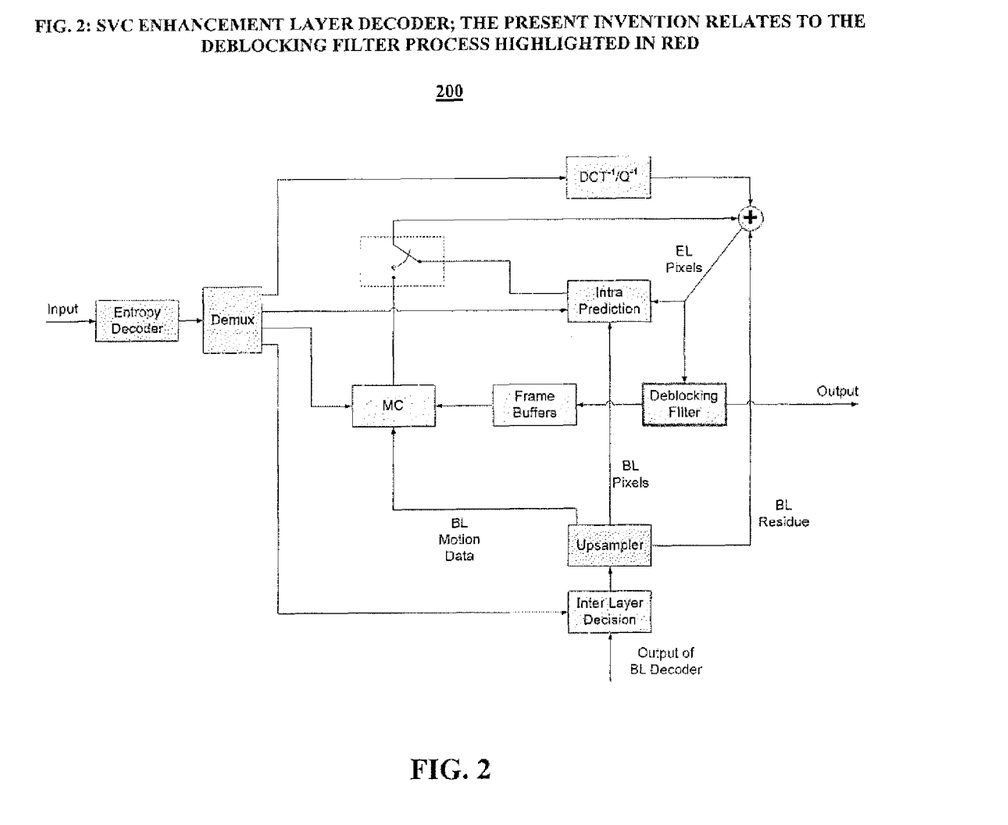
FIG. 2 is a block diagram illustrating an exemplary prior art SVC enhancement layer decoder.

FIGS. 1 and 2 show the exemplary architectures of a video encoder 100 and a decoder 200, respectively, both of which comply with the recent SVC draft standard and include H.264/AVC functions such as a deblocking filter within a motion compensation loop to limit visual artifacts created by block edges. Video encoder 100 and decoder 200 have common deblocking filter elements (e.g., deblocking filter 110 and 220). The deblocking filter is applied after the inverse transform in the encoder (before reconstructing and storing the macroblock for future predictions) and in the decoder (before reconstructing and displaying the macroblock). The filter smoothes block edges, improving the appearance of decoded frames. The filtered image is used for motion-compensated prediction of future frames and this can improve compression performance because the filtered image is often a more faithful reproduction of the original frame than a blocky unfiltered image.

The deblocking filter can optionally be applied to a decoded picture before storing the picture into a frame buffer for future reference in the encoding and decoding process. The filtering decision should be able to distinguish between true edges in the image and those created by the block quantization of the transform-coefficients. True edges should be left unfiltered as much as possible. In order to separate the two cases, the sample pixel values across the boundary are analyzed. The H.264 standard defines thresholds alpha ($\alpha$) and beta ($\beta$), which increase with the averaged QP values of two blocks, as the basis for deciding whether to apply or not apply the deblocking filter to their common boundary. The effect of the filter decision is to 'switch off' the filter when there is a significant gradient across the boundary in the original image. When the averaged QP is small, anything other than a very small gradient across the boundary is likely to be due to actual image features (rather than blocking effects), which should be preserved, and so the thresholds $\alpha$ and $\beta$ are low. When the averaged QP is larger, blocking distortion is likely to be more significant and $\alpha$, $\beta$ are higher so that more boundary samples are filtered.

Figure 3:
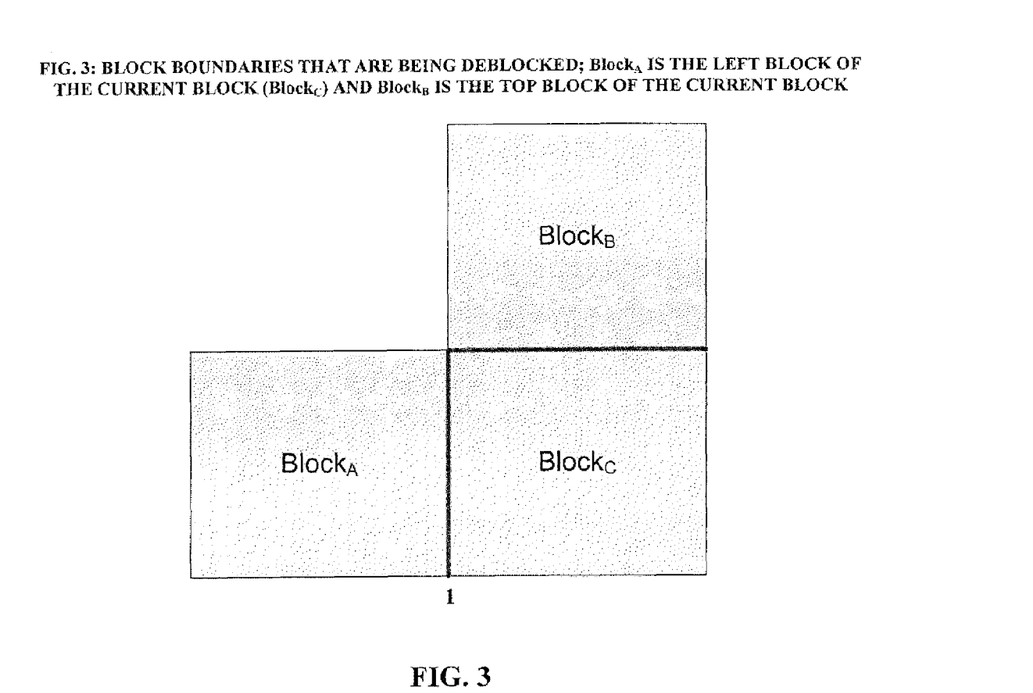
FIG. 3 is a schematic diagram illustrating the boundaries of a picture block that is being deblocked.
Figure 4:
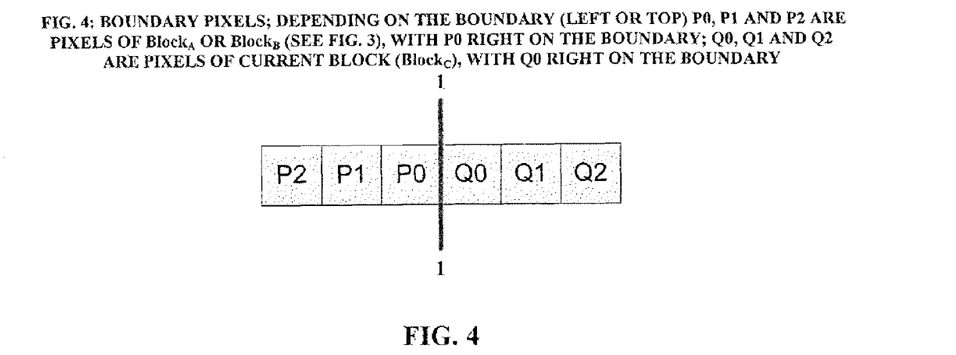
FIG. 4 is a schematic diagram illustrating pixels adjacent to a block boundary that is being deblocked.

In the deblocking process, a picture is divided into blocks, and by standard convention each block's left and top edges are deblocked. FIG. 3 shows, for example, a current block ($Block_C$) with its left and top edges forming boundaries (e.g., boundaries 1 and 2) with $Block_A$ and $Block_B$, respectively. For a given block boundary, the deblocking process for removing boundary artifacts involves modifying boundary pixel values (e.g., P2, P1, P0, Q0, Q1, Q2 in FIG. 4) as a function of the deblocking filter strength, $B_S$, selected for the subject boundary, the QP values of the blocks forming the boundary, and the actual boundary pixel values.

The boundary filtering strength, $B_S$, has values in the range 0, 1, . . . , 4. Under the H.264 standard, the $B_S$ value selected for an edge depends on the block modes and conditions (e.g., $B_S=4$, if one of the blocks is intra-coded and the edge is a macroblock edge, and $B_S=2$, if one of the blocks has coded residuals, etc.).

$B_S=4$ indicates the strongest filtering process where all 3 pixels (e.g., P2, P1, P0, Q0, Q1, and Q2) at each side of the boundary are modified based on the actual pixel values surrounding the boundary and the QP of the corresponding blocks, and $B_S=0$ indicates the weakest filtering (i.e., no filtering). For $B_S=1, 2, 3$, at most 2 pixels at each side of the boundary are modified. Thus the deblocking filtering requires access to (and may modify) the pixels of 4×4 or 8×8 blocks along the boundary of the block to the left and of the block above the block being filtered.

As noted above, the filter is a function of the deblocking filter strength, $B_S$, selected for the subject boundary, the QP values of the blocks forming the boundary, and the actual boundary pixel values. The average of the QP values of the blocks forming the boundary is used to define thresholds $\alpha$ and $\beta$ for application of filtering. A group of samples from the set (P2, P1, P0, Q0, Q1, Q2) is filtered only if in addition $B_S>0$, $|P0-Q0|<\alpha$ and $|P1-P0|<\beta$, $|Q1-Q0|\le\beta$.

Figure 5:
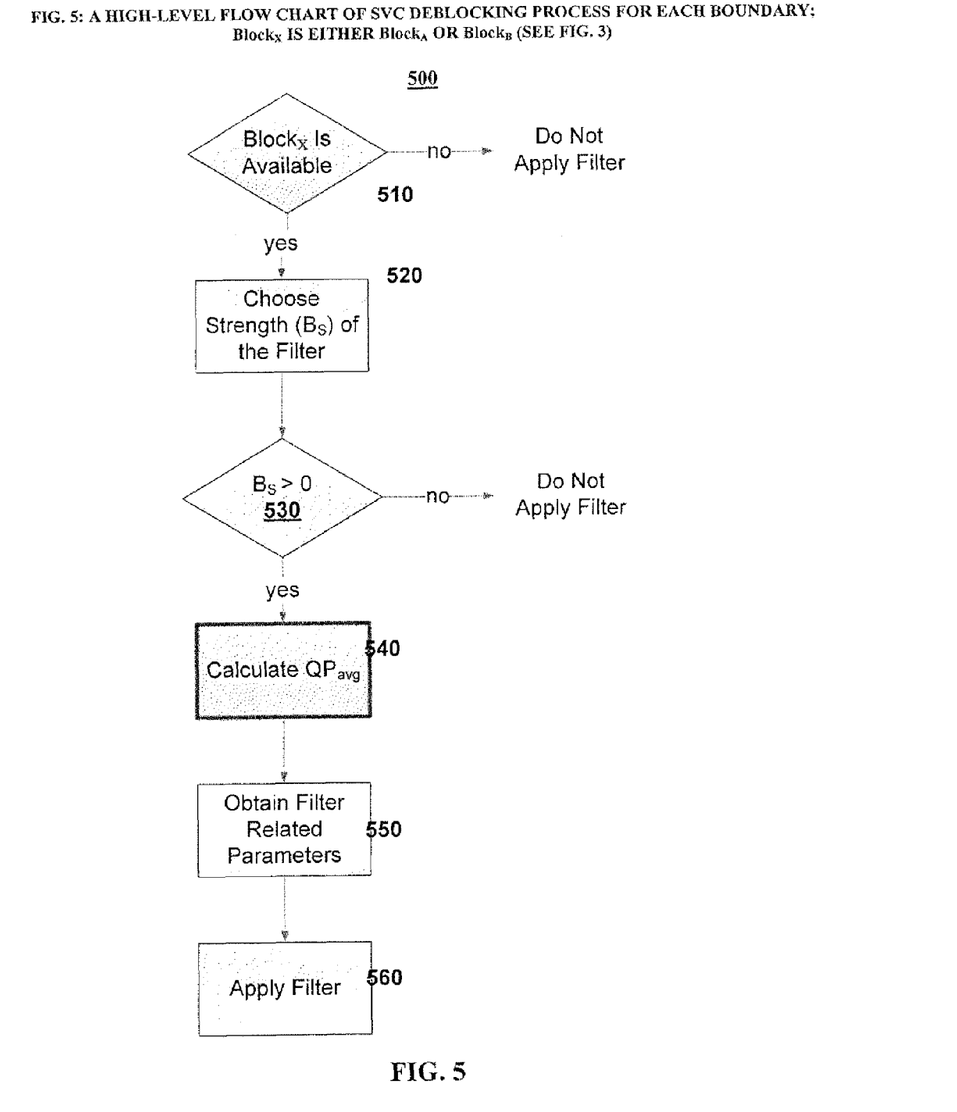
FIG. 5 is a flow diagram of an exemplary deblocking process, in accordance with the principles of the present invention.

With bigger average QP, more pixels will be chosen to get filtered and the pixels will be modified with stronger smoothing function. For example, with $B_S=4$ and for some low average QP, P0 can be modified using the equation P0=(2P1+P0+P1+2)/4, whereas for the same pixel with a larger average QP, P0=(P2+2P1+2P0+2Q0+Q1+4)/8. FIG. 5 shows a flow diagram as an exemplary deblocking process 500 for a current block (e.g., $Block_C$). At step 510, a determination is made whether a neighboring block (e.g., $Block_A$ or $Block_B$) is present. At step 520, a filter strength $B_S$ is selected (e.g., according to H.264 rules). At step 530, process 500 terminates without filter application for $B_S=0$. For positive $B_S>0$, $QP_{avg}$ values are computed at step 540. At step 550, the computed $QP_{avg}$ values are used to obtain filter related parameters (e.g., standard thresholds $\alpha(QPavg)$ and $\beta(QPavg)$) and to define the deblocking filter, which is applied at step 560. Steps 510-560 of process 500 are the same or similar to those of standard deblocking processes, except in that the present invention provides an improved calculation of $QP_{avg}$ (step 540). The SVC standard specifies that $QP_{avg}$ should be set equal to the average of the QPs of the blocks forming the boundary B:

$$QP_{avg}=QP_X+QP_C \qquad (1),$$

where $QP_X$ is the QP of the neighboring block across the boundary (e.g., $Block_A$ or $Block_B$) and $QP_C$ is the QP of the subject block (e.g., $Block_C$ in FIG. 3). A major disadvantage of this standard $QP_{avg}$ calculation is that instances where only BL block information is used in the coding process of the EL block (which, for example, often is case when the QP of the EL block is much higher than that of the BL block), using the EL block's QP can over-smooth the boundary pixels and thereby degrade video quality.

An algorithm for deriving QP of each block used in calculating $QP_{avg}$ (e.g., at step 540) in a preferred embodiment of the present invention is as follows:
1. If $Block_X$ has any non-zero coefficient or if $Block_C$ has any non-zero coefficient, then $QP_X$ is set equal to the QP of $Block_X$ and $QP_C$ is set equal to the QP of $Block_C$.
2. Otherwise, if $Block_X$ and $Block_C$ have motion vectors that are different by more than a half pixel, then $QP_X$ is set equal to the QP of $Block_X$ and $QP_C$ is set equal to the QP of $Block_C$.
3. Otherwise, the following applies
    If the residue of $Block_X$ is predicted from the corresponding BL block only, and no difference in motion vectors to neighboring blocks is detected as explained above, then $QP_X$ is set equal to the average of the QP of the BL block and the QP of $Block_X$.
    Otherwise, $QP_X$ is set equal to the QP of $Block_X$
    If the residue of $Block_C$ is predicted from the corresponding BL block only, and no difference in motion vectors to neighboring blocks is detected as explained above, then $QP_C$ is set equal to the average of the QP of the BL block and the QP of $Block_C$.
    Otherwise, $QP_C$ is set equal to the QP of $Block_C$.

The computed QPavg value is then used to calculate filter application thresholds $\alpha$(QPavg) and $\beta$(QPavg) at step 550 of process 500.

Figure 6:
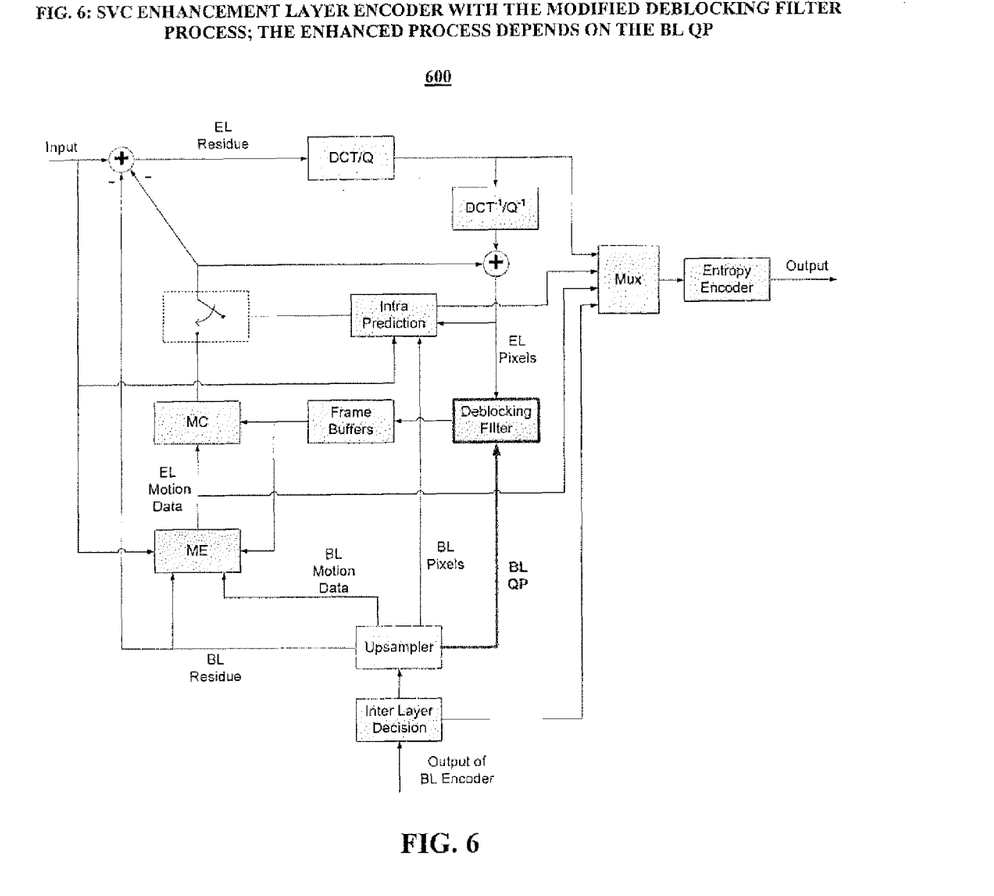
FIG. 6 is a block diagram illustrating an exemplary SVC enhancement layer encoder, in accordance with the principles of the present invention.
Figure 7:
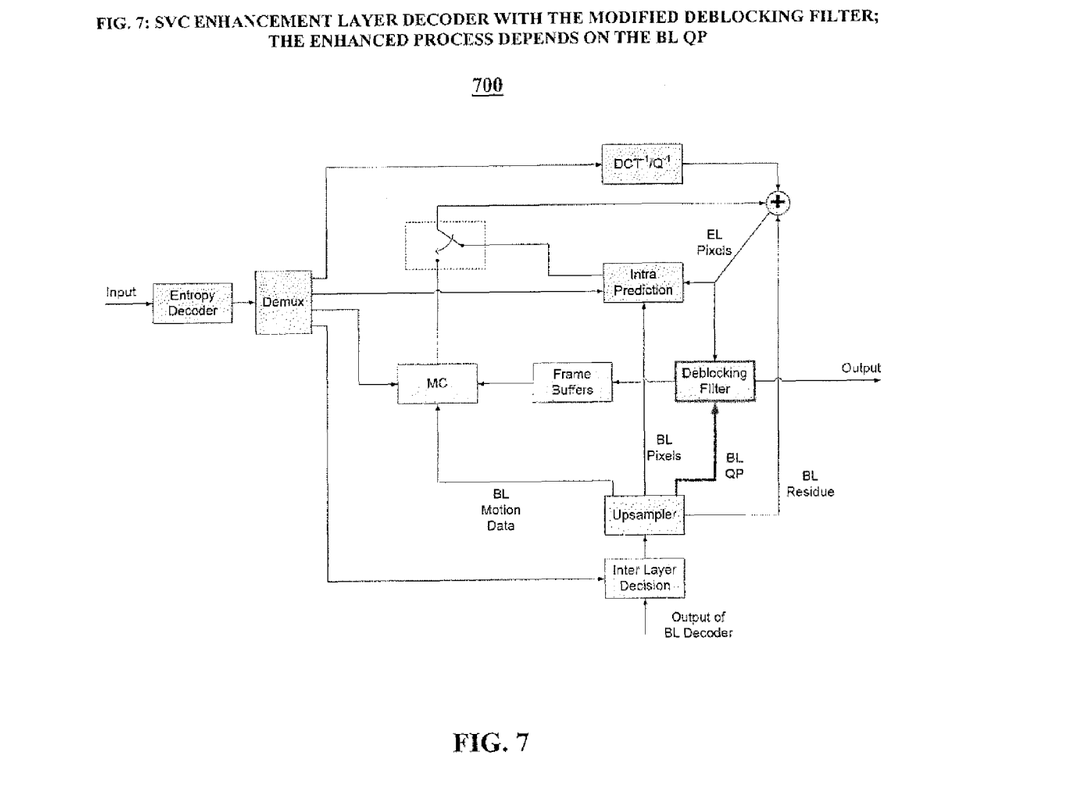
FIG. 7 is a block diagram illustrating an exemplary SVC enhancement layer decoder, in accordance with the principles of the present invention.

FIGS. 6 and 7 show exemplary SVC enhancement layer encoder 600 and decoder 700, respectively, which are configured to implement process 500 with the inventive mechanism for deriving QP of each block used in computing $QP_{avg}$.

Other mathematical relationships for setting $QP_X$ and $QP_C$ can be used instead of the averaging operation, in accordance with the principles of the present invention. For example, $QP_X$ and $QP_C$ can be set equal to the QP values of the BL block corresponding to $Block_X$ and $Block_C$, respectively, or, when multiple enhancement layers are present, $QP_X$ and $QP_C$ can be set to the minimum QP value among all lower layer blocks with respect to the layer of $Block_X$ and $Block_C$, respectively. For example, when the enhancement layer QP is significantly higher than that of the base layer, it may be advantageous to strictly use the base layer QP.

The EL block is comprised of one or more BL blocks. In the case there are more than one BL blocks, an average of the BL blocks' QPs can be used as the QP of the BL or the QP of the most dominant BL block (the mostly coved BL block by the EL block) can be chosen.

It will be understood that in accordance with the present invention, the deblocking techniques described herein may be implemented using any suitable combination of hardware and software. The software (i.e., instructions) for implementing and operating the aforementioned deblocking techniques can be provided on computer-readable media, which can include, without limitation, firmware, memory, storage devices, microcontrollers, microprocessors, integrated circuits, ASICs, on-line downloadable media, and other available media.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

For example, a specific deblocking process may be implemented as a use- or user-configurable process. Its configuration may be signaled by data components placed in appropriate higher-level syntax structures (e.g., an indicator parameter in the slice header, picture parameter set, or sequence parameter set). Further, although the invention is described herein in terms of the H.264 SVC draft specification, it will be understood that the inventive technique is applicable to any scalable coding system in which deblocking is used regardless of whether the deblocking is in-loop (i.e., the deblocked picture is used as a reference picture) or performed as a post-processing operation after decoding has taken place.

The invention claimed is:

1. A method for deblocking a reconstructed/decoded picture in a scalable video encoding/decoding system in which deblocking is accomplished by applying a filter to smooth pixel values adjacent to a boundary of a block $Block_C$ shared with another block $Block_X$, wherein the number of pixels that are filtered and the type of filtering depend at least on quantization parameter (QP) values $QP_X$ and $QP_C$ assigned to blocks $Block_C$ and $Block_X$, respectively, the method comprising:
   (1a) if neither $Block_X$ nor $Block_C$ has any non-zero coefficient, and if $Block_X$ and $Block_C$ do not have motion vectors that are different by more than a half pixel, then
        (2) if a residue of $Block_X$ is predicted only from one or more corresponding base layer (BL) blocks then setting $QP_X$ equal to a weighted average of a QP derived from the one or more corresponding BL blocks and the QP of $Block_X$, otherwise setting $QP_X$ equal to the QP of $Block_X$, and
        (3) if a residue of $Block_C$ is predicted only from one or more corresponding BL blocks then setting $QP_C$ equal to a weighted average of a QP derived from the said one or more corresponding BL blocks and the QP of $Block_C$, otherwise setting $QP_C$ equal to the QP of $Block_C$,
   (1b) otherwise, setting $QP_X$ equal to the QP of $Block_X$ and setting $QP_C$ equal to the QP of $Block_C$.

2. The method of claim 1 wherein the QP derived from the one or more corresponding BL blocks for $Block_X$ or $Block_C$ is a weighted average of the QPs of the BL blocks.

3. The method of claim 1 wherein the QP derived from the one or more corresponding BL blocks for $Block_X$ or $Block_C$ is the minimum of the QPs of the BL blocks.

4. The method of claim 1 wherein the QP derived from the one or more corresponding BL blocks for $Block_X$ or $Block_C$ is the QP of the BL block that has the largest overlap with $Block_X$ or $Block_C$, respectively.

5. The method of claim 2 wherein the BL blocks themselves are predicted from another lower base layer (BL'), and wherein their QP is derived as in claim 1 with the current layer replaced by BL and the base layer replaced by BL'.

6. The method of claim 1 wherein the weighting function is signaled in the bitstream using appropriate flags or parameters.

7. The method of claim 2 wherein the weighting function is signaled in the bitstream using appropriate flags or parameters.

8. Non-transitory computer readable media comprising a set of instructions to perform the methods recited in one of claims 1-7.

9. A device for deblocking a reconstructed/decoded picture in a scalable video encoding/decoding system, the device comprising:
   a filter which smoothes pixel values adjacent to a boundary of a block $Block_C$ shared with another block $Block_X$, wherein the number of pixels that are filtered and the type of filtering depend at least on quantization parameter (QP) values $QP_X$ and $QP_C$ assigned to blocks $Block_C$ and $Block_X$, respectively, and wherein (1a) if neither $Block_X$ nor $Block_C$ has any non-zero coefficient, and if $Block_X$ and $Block_C$ do not have motion vectors that are different by more than a half pixel, then    (2) if a residue of $Block_X$ is predicted only from one or more corresponding base layer (BL) blocks then $QP_X$ is set equal to a weighted average of a QP derived from the one or more corresponding BL blocks and the QP of $Block_X$, otherwise $QP_X$ is set equal to the QP of $Block_X$, and    (3) if a residue of $Block_C$ is predicted only from one or more corresponding BL blocks then $QP_C$ is set equal to a weighted average of a QP derived from the said one or more corresponding BL blocks and the QP of $Block_C$, otherwise $QP_C$ is set equal to the QP of $Block_C$.

(1b) otherwise, $QP_X$ is set equal to the QP of $Block_X$ and $QP_C$ is set equal to the QP of $Block_C$.

10. The device of claim 9 wherein the QP derived from the one or more corresponding BL blocks for $Block_X$ or $Block_C$ is a weighted average of the QPs of the BL blocks.

11. The device of claim 9 wherein the QP derived from the one or more corresponding BL blocks for $Block_X$ or $Block_C$ is the minimum of the QPs of the BL blocks.

12. The device of claim 9 wherein the QP derived from the one or more corresponding BL blocks for $Block_X$ or $Block_C$ is the QP of the BL block that has the largest overlap with $Block_X$ or $Block_C$, respectively.

13. The device of claim 9 wherein the BL blocks themselves are predicted from another lower base layer (BL'), and wherein their QP is derived as in claim 1 with the current layer replaced by BL and the base layer replaced by BL'.

14. The device of claim 9 wherein the weighting function is signaled in the bitstream using appropriate flags or parameters.

15. The device of claim 10 wherein the weighting function is signaled in the bitstream using appropriate flags or parameters.

* * * * *